March 31, 1959  G. A. GAEBLER  2,879,719
CONVERTIBLE VEHICLE FOR ROAD AND RAIL
Filed March 21, 1956  2 Sheets-Sheet 1
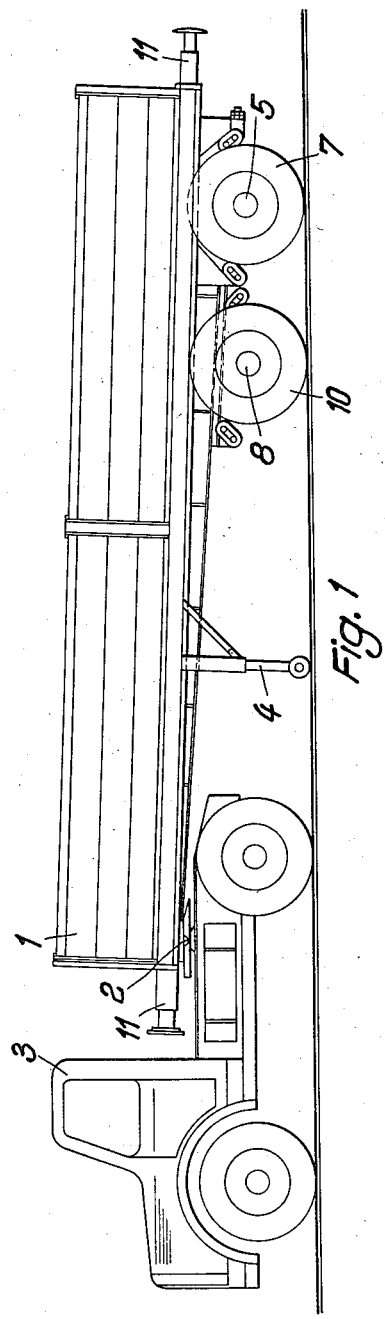
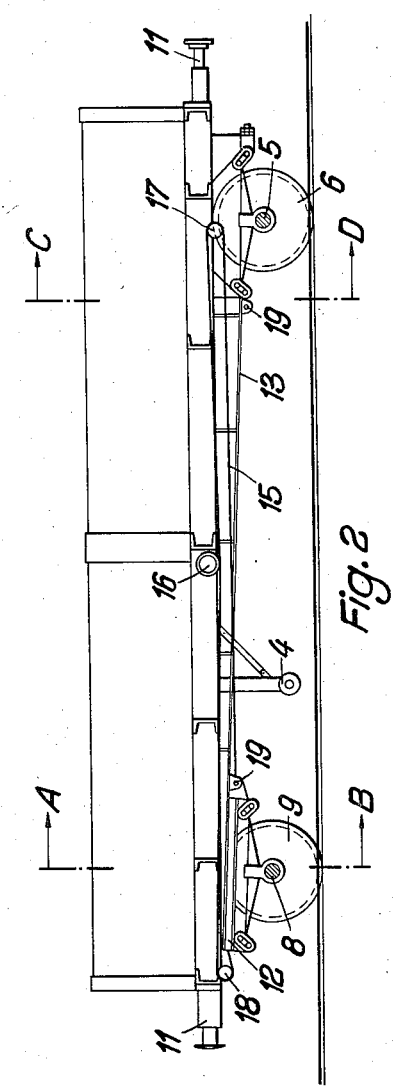
Inventor:
GUSTAV ADOLPH GAEBLER

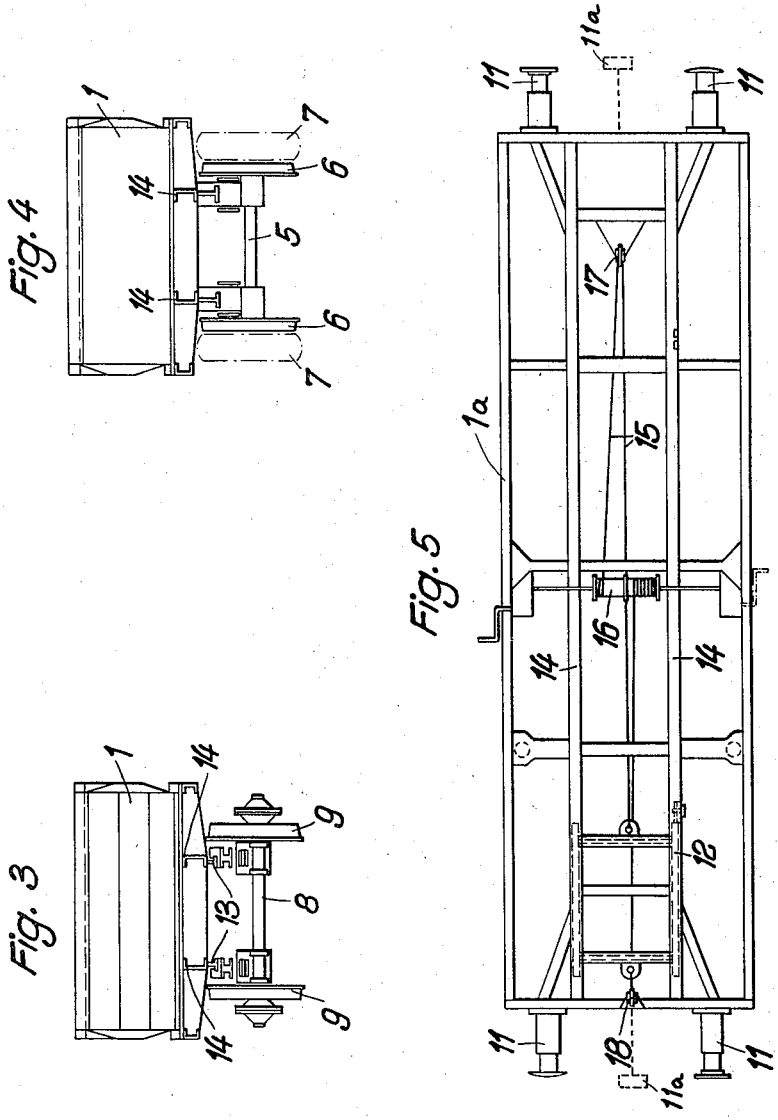

2,879,719

CONVERTIBLE VEHICLE FOR ROAD AND RAIL

Gustav Adolph Gaebler, Langen in Hessen, Germany

Application March 21, 1956, Serial No. 572,962

Claims priority, application Germany March 23, 1955

4 Claims. (Cl. 105—215)

This invention relates to improved means for converting vehicles for rail travel and road travel respectively.

The conversion of wheels from a flanged form for travel on rails, to a rubber-tired form for travel over roads, is well known, but other problems still remain with regard to converting vehicles as a whole from rail to road, and vice versa. In accordance with the invention such conversion is effectively accomplished by use of a set of wheels adjacent one end of the vehicle, and another set of wheels which are shiftable between a position adjacent the first set of wheels, for purposes of road travel, and a position adjacent the other end of the vehicle, for purposes of rail travel. Putting both sets of wheels at one end of the vehicle reduces the load on each axle at that end of the vehicle, which is highly desirable for purposes of road travel, and enables the other end of the vehicle to be attached to and supported by a conventional truck tractor, which also serves to draw the vehicle along the road. When the vehicle is converted for rail travel it is adapted to be coupled in a train of railway cars, in the usual way.

In some cases the governing regulations limit the axial load for rail vehicles to about 20 tons, and the axial load of road vehicles to about half of that weight. The corresponding regulations for the length of tractor trailers may be about 14 meters, and the total weight limit about 32 tons. This weight is distributed among the axles of the tractor and of the trailer. The maximum weight of the trailer may be about 26 tons, of which about 16 tons is supported by the rear axles, and about 10 tons is supported by the wheels of the tractor under the front end of the trailer. The load of such a trailer may be about 20 tons. Of the permissible truck length of 14 meters, about 10 or 11 meters can be used for freight space and consequently in some cases the load capacity and length of the freight space of a truck trailer may correspond with the load capacity and length of a rail freight car. In any event, the shift of a set of wheels from one end of the vehicle to the other in accordance with the invention, makes it possible to reduce the unit axle loads when the vehicle is converted for road travel as a trailer, in a more efficient and convenient manner.

Other objects, advantages and details of the invention will become apparent from the following description of the present embodiment of the invention shown, for purposes of illustration only, in the accompanying drawings. In the drawings:

Figure 1 is a side elevation of a trailer truck in which the trailer is a convertible vehicle embodying the inventions;

Figure 2 is a side elevation of the trailer vehicle shown in Figure 1, after conversion for rail travel;

Figures 3 and 4 are views of vertical sections on the lines A—B and C—D in Figure 2; and Figure 5 is a top plan elevation of the undercarriage of the convertible vehicle shown in Figures 1–4.

Referring now more particularly to the drawings, Figure 1 shows a convertible vehicle 1 detachably hitched by a conventional trailer-truck coupling 2 to tractor unit 3. A set of retractable supports 4 hold up the free end of the vehicle 1 when it is converted for use as a truck trailer, but is not supported at its free end by the coupling 2 of tractor 3. The vehicle 1 has an axle 5 which carries a pair of flanged rail wheels 6, and which has extensions detachably mounting a pair of rubber-tired wheels 7 suitable for road travel, and of larger diameter than the rail wheels 6. The conversion from use of the wheels 6 to the wheels 7, and vice versa, is in accordance with known practice. The axle 5 is journaled on a spring mounting (not fully shown) fixed to the undercarriage 1a of vehicle 1. The vehicle 1 has another axle 8 carrying a like pair of flanged wheels 9, and having like extensions for detachably mounting a like pair of rubber-tired wheels 10. Each end of the vehicle 1 is provided with bumpers 11 and with railway couplers 11a (shown only diagrammatically, in Figure 5), attached to the undercarriage 1a, for use in accordance with conventional railway practice.

Axle 8 is journaled on a spring mounting (not fully shown) fixed to a frame 12 which is slidably mounted on a pair of parallel guide members 13. The guide members 13 extend lengthwise of the vehicle 1 and are secured to longitudinal stringers 14 of the undercarriage 1a. Opposite ends of frame 12 are tied to opposing ends of a cable 15 which is wound around a winch drum 16 and trained around pulleys 17 and 18 secured to opposite ends of the undercarriage 1a. The drum 16 pays out a portion of the cable 15, as it reels in another portion of the cable 15, so that the cable is always taut and holds the frame 12 stationary when the drum is locked or braked against the rotation. The drum 16 is rotatable manually by crank, or by any suitable power means, such as from the tractor 3. Rotation of the drum 16 operates the cable 15 to move the frame 12 along the guides 13 in order to shift the axle 8 adjacent wheels 9 from one end of the vehicle 1 to the other. The frame 12 can be held in either of its extreme positions by studs 19 secured to the undercarriage 1a, these studs being removably insertable into a bore in the frame 12 to lock it in position. When the vehicle 1 is to be used for road travel, the locked stud 19 is released and the drum 16 is rotated to bring the frame 12 along the guides 13 to a position adjacent the axle 5, where the other stud 19 is inserted to lock the frame 12 in position. The front end of the vehicle 1 is then hitched to the truck tractor 3 by means of the coupling 2, and the supports 4 are retracted, so that the weight of the vehicle 1 and its load are distributed among the rear axles 8 and 5, and the axles of the tractor 3. This distributes the load among several axles, and thus reduces the unit axle load during road travel.

When the vehicle 1 is to be converted for rail travel, it is unhitched from the tractor 3, the locked stud 19 is released, and the drum 16 is rotated to carry the frame 12 and axle 8 to the forward end of the vehicle 1, where the other stud 19 is locked to hold the frame 12 in place. The wheels 7 and 10 are removed, and the rail wheels 6 and 9 are placed on rails.

The retractable supports 4 are arranged to be out of the way of the frame 12 and axle 8 during the conversion operation. This is accomplished by mounting the supports 4 sufficiently far apart to allow passage of the axle 8 between them at all times, or by attaching them so that they can be swung outwardly or removed for that purpose.

The vehicle 1a is entirely horizontal when on rails, and is tilted when used as a truck trailer, so that the frame 12 must be moved downwardly as well as longitudinally when it is shifted to trailer position, in order to put the wheels 10 against the ground as firmly as the wheels 7. In accordance with the invention, this is most efficiently accomplished by mounting the guide members 13 to slant downwardly in the direction of the fixed axle 5.

While I have illustrated and described a present preferred embodiment of the invention, it will be understood that the invention is not limited thereto, but may be otherwise variously embodied and practiced within the scope of the following claims.

I claim:

1. A convertible vehicle having a first set of wheel mounting means positioned adjacent one end of the vehicle, and another set of wheel mounting means, both sets of said means being convertible to mount flanged rail wheels and rubber-tired road wheels for use on rail and road respectively, means supporting the said other set for movement from a position adjacent the first set to a position adjacent the other end of the vehicle, means to hold the said other set at each of said positions and means on said other end of the vehicle to hitch it on a truck tractor, said vehicle being adapted to be hitched as a truck trailer when road wheels are installed and both sets of wheel mounting means are adjacent each other, and to serve as a railway car when rail wheels are installed and the respective sets of wheel mounting means are adjacent opposite ends of the vehicle.

2. A convertible vehicle having a first set of wheel mounting means positioned adjacent one end of the vehile, and another set of wheel mounting means, both sets of said means being convertible to mount flanged rail wheels and rubber-tired road wheels for use on road and rail respectively, means supporting the said other set and movably mounted on the vehicle to move said other set from a position adjacent the first set to a position adjacent the other end of the vehicle, means operable to move said supporting means, means to latch said supporting means when the said other set is at each of said positions, means on said other end of the vehicle to hitch it on a truck tractor for purposes of road travel, and coupling means at both ends of the vehicle for coupling it in a train for purposes of rail travel.

3. A convertible vehicle having a first set of wheel mounting means positioned adjacent one end of the vehicle, and another set of wheel mounting means, both sets of said means being convertible to mount flanged rail wheels and rubber-tired road wheels for use on rail and road respectively, means supporting the said other set for movement from a position adjacent the first set to a position adjacent the other end of the vehicle, means to hold the said other set at each of said positions and means on said other end of the vehicle to hitch it on a truck tractor, said vehicle being adapted to be hitched as a truck trailer when road wheels are installed and both sets of wheel mounting means are adjacent each other, and to serve as a railway car when rail wheels are installed and the respective sets of wheel mounting means are adjacent opposite ends of the vehicle, and the said supporting means for the movable set of wheel mounting means comprising guide members extending between the ends of the vehicle and slanting downwardly in the direction of the said first set of wheel mounting means, the degree of slant being sufficient to cause the road wheels to bear evenly on the road when the vehicle is hitched on a truck tractor, and to cause the vehicle to ride parallel with the rails when rail wheels are installed.

4. A convertible vehicle having a first set of wheel mounting means positioned adjacent one end of the vehicle, and another set of wheel mounting means, both sets of said means being convertible to mount flanged rail wheels and rubber-tired road wheels for use on rail and road respectively, means supporting the said other set for movement from a position adjacent the first set to a position adjacent the other end of the vehicle, the said supporting means being a frame, parallel guide members along which the frame is slidable, means to move said frame, said moving means comprising a cable attached to opposite ends of the frame, and a rotatable drum around which the cable is wrapped, means to hold the said other set at each of said positions and means on said other end of the vehicle to hitch it on a truck tractor, said vehicle being adapted to be hitched as a truck trailer when road wheels are installed and both sets of wheel mounting means are adjacent each other, and to serve as a railway car when rail wheels are installed and the respective sets of wheel mounting means are adjacent opposite ends of the vehicle.

References Cited in the file of this patent

UNITED STATES PATENTS

| | | |
|---|---|---|
| 2,030,311 | Messick | Feb. 11, 1936 |
| 2,267,338 | Nugent | Dec. 23, 1941 |